United States Patent [19]
Peng

[11] Patent Number: 5,521,973
[45] Date of Patent: May 28, 1996

[54] TRANSPORT APPARATUS FOR LARGE NETWORK TELECOMMUNICATION EQUIPMENT

[75] Inventor: Peter Peng, Howell, N.J.

[73] Assignee: AT&T Corp., Murray Hill, N.J.

[21] Appl. No.: 170,626

[22] Filed: Dec. 20, 1993

[51] Int. Cl.$^6$ .......................... H04M 3/00; B65D 85/28; H02B 1/20; H02B 1/01
[52] U.S. Cl. .......................... 379/329; 206/373; 361/729; 361/826; 361/829; 379/327; 381/82
[58] Field of Search ........................ 379/325, 326, 379/327, 328, 329, 330; 361/729, 735, 826, 829; 381/77, 82, 118; 206/701, 702, 372, 373

[56] References Cited

U.S. PATENT DOCUMENTS

| 4,202,029 | 5/1980 | Yoshikawa et al. | 379/329 |
| 4,670,626 | 6/1987 | Fisher et al. | 379/326 X |
| 4,836,374 | 6/1989 | Hutchins et al. | 206/373 |
| 5,278,725 | 1/1994 | Konno et al. | 361/729 X |

OTHER PUBLICATIONS

Lafayette Radio Electronics, 1970, pp. 78 and 79.

Primary Examiner—Thomas W. Brown
Assistant Examiner—Harry S. Hong

[57] ABSTRACT

A transport apparatus for large network telecommunication equipment, includes a central switch frame for holding electronic equipment, and having first and second switch bays and a main controller bay sandwiched between the first and second switch bays in an in-line, rigidly fixed manner; first and second end cable storage frames, each for holding cables; first and second junction panels; a first hinge assembly for hingedly connecting one end of the first junction panel to the first end cable storage frame and an opposite end of the first junction panel to the first switch bay to pivotally move the first end cable storage frame between an in-line configuration in-line with the first switch bay and a folded configuration positioned in front of the first switch bay; a second hinge assembly for hingedly connecting one end of the second junction panel to the second end cable storage frame and an opposite end of the second junction panel to an opposite end of the second switch bay to pivotally move the second end cable storage frame between an in-line configuration in-line with the second switch bay and a folded configuration positioned in front of the second switch bay; and the end cable storage frames and the switch bays each include tie bars for supporting cable bundles extending between the end cable storage frames and the switch bays in a looped U-shape extending across the junction panels.

9 Claims, 5 Drawing Sheets

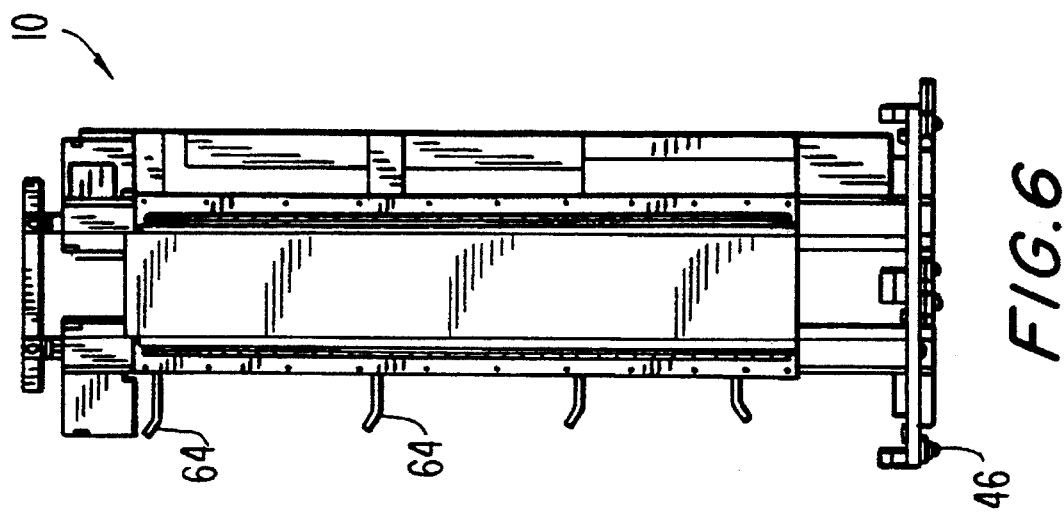
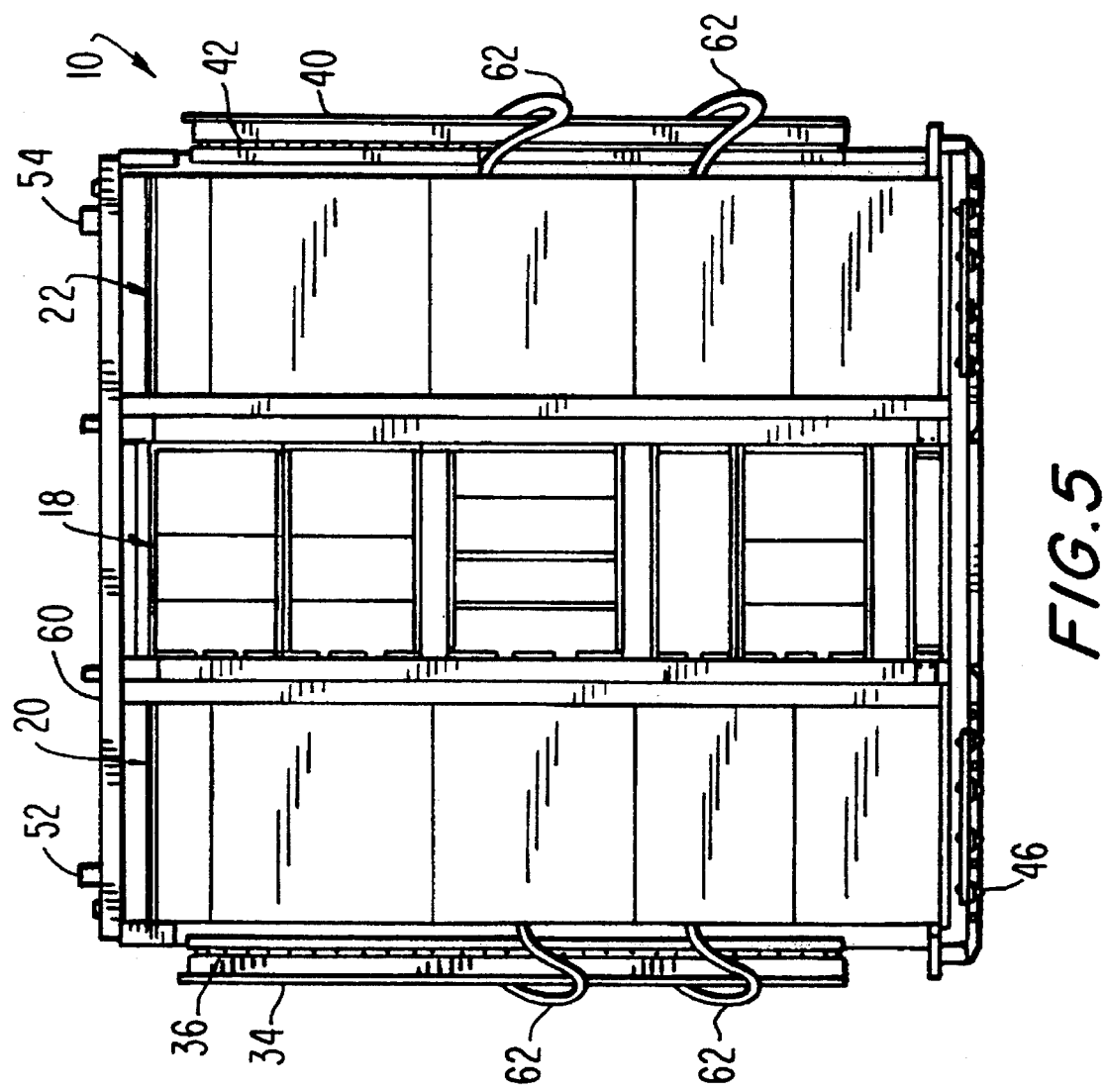

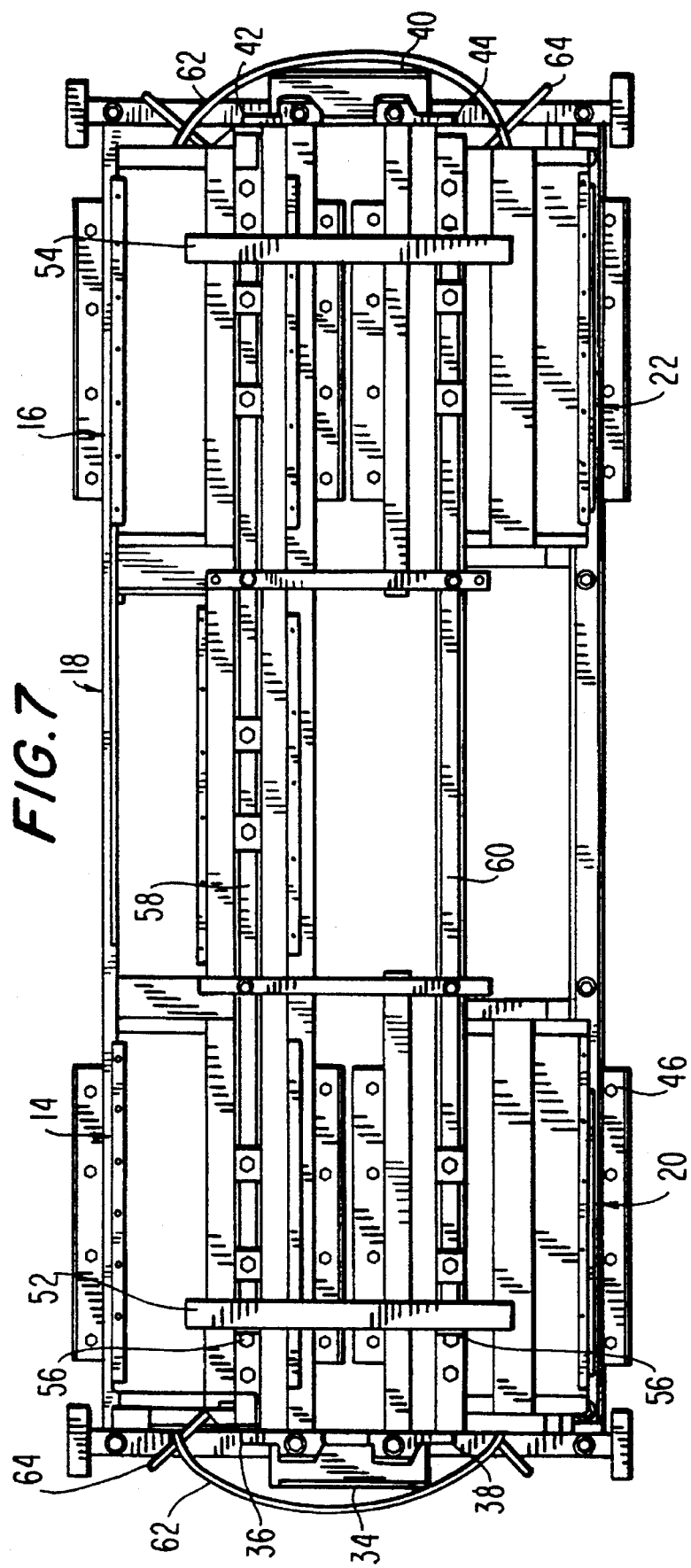

TRANSPORT APPARATUS FOR LARGE NETWORK TELECOMMUNICATION EQUIPMENT

BACKGROUND OF THE INVENTION

The present invention relates generally to transport apparatus, and more particularly, is directed to transport apparatus for large network telecommunication equipment.

The manner in which telephones at different locations are connected to each is well known. Basically, one telephone is connected to a first Central Office, either directly or indirectly connected through a Remote Terminal. The first Central Office is connected to a second Central Office, which is connected to the other telephone directly or indirectly through another Remote Terminal. The Central Offices and Remote Terminals provide for switching of the telephone signals and enhancement of the telephone signals.

Generally, the Central Offices use digital access and cross-connect systems (DACS) as one of the switching units. It is noted that the signal from a telephone is at a relatively low rate. By the time it arrives at the cross-connect system, it has been converted to a higher rate of a direct sequence (DS) waveform, such as DS1 and DS3. DS waveforms are pseudorandom digital streams generated by digital techniques and transmitted without significant spectral filtering. The cross-connect system receives the DS waveform signals and cross-connects the signals in a large matrix. The signals are then sent back out through different interface bays with DS1 and DS3 waveform formats. The interface bays are connected with external equipment, either within the same Central Office, other Central Offices, or Remote Terminals.

In the cross-connect system, there are numerous interface bays that receive and transmit the DS1 and DS3 format signals, with the interface bays being connected to a switch complex that provides re-routing or cross-connecting of the signals. For example, there may be an interface bay that accepts only DS1 format signals, an interface bay that accepts only DS3 format signals, and an interface bay that accepts both DS1 and DS3 format signals. The interface bays are connected to the switch complex by twisted bundles of copper wires. The switch complex generally includes power units, controllers and the like.

All of the equipment at the Central Office, that is, the large network telecommunication equipment, such as the digital cross-connect systems, are mounted on metal network bay frames or racks. Each frame is generally formed by two upright flanges, a connecting base which connects the lower ends of the upright flanges, and a top support which connects the upper ends of the upright flanges. Thus, there is front and rear access to the telecommunication equipment mounted on the frames. Generally, such frames are large, having a width ranging from about nineteen inches to twenty six inches, and a height ranging from about seven feet to about eleven feet, six inches. The DACS equipment is designed to fit in a twenty-six inch wide, seven foot high frame, regardless of the frame size.

For example, for a smaller system such as the DACS IV-2000 (256) system sold by AT&T, the start-up shipment is comprised of one switch bay where all of the switch and controller modules are mounted, and one full interface bay and two half cable storage bays. Each bay utilizes one frame, so that there are four frames coupled together. For the larger DACS IV-2000 (512) system, the start-up shipment is comprised of two switch bays and a main controller bay and two cable storage bays. In such case, the amount of cabling is proportionally larger.

Thus, for large network equipment, such as the DACS IV-2000 sold by AT&T, a large amount of cabling is required between the modules within the switch complex and between the switch complex and the cable storage bays. In terms of workmanship and quality, it is desirable to have the cables pre-installed in the factory, since the installation is performed by highly trained and specialized workers in a controlled environment. In addition, the quality control inspection and testing processes at the manufacturing location are always tightly monitored.

Thus, to ensure such reliability and the highest integrity within the switch complex, the switch complex cabling is completed in the factory. For the interface bay cables, one end thereof is installed in the factory to ensure reliability. The other end is left unconnected for field connection.

However, the frames for the switch complex and cable storage bays are rigidly connected together, in an in-line manner, and are shipped in this manner, with the cables connected as discussed above. Thus, the resulting size of the initial shipment package becomes an in-line arrangement of five seven foot network bay frames for the DACS IV-2000 (512), with a total footprint of ten feet, ten inches by one foot. This, however, presents a problem in transport, due to limitations of elevator size and office aisle clearance, particularly around tight corners.

SUMMARY OF THE INVENTION

Accordingly, it is an object of the present invention to provide transport apparatus for large network telecommunication equipment that overcomes the problems with the aforementioned prior art.

It is another object of the present invention to provide transport apparatus for large network telecommunication equipment which enables transport of the equipment in different configurations.

It is still another object of the present invention to provide transport apparatus for large network telecommunication equipment that provides flexibility in the changing of configurations for transport.

It is yet another object of the present invention to provide transport apparatus for large network telecommunication equipment that reduces stress on wire bundles between the different connected banks of the equipment, regardless of the change of configuration thereof.

It is a further object of the present invention to provide transport apparatus for large network telecommunication equipment that enables full factory installation of cables.

In accordance with an aspect of the present invention, transport apparatus for large network telecommunication equipment includes central switch frame means for holding electronic equipment; end cable storage frame means for holding cables; at least one junction panel; and hinge means for hingedly connecting one end of each junction panel to the end cable storage means and an opposite end of each junction panel to the central switch frame means in a manner to permit pivoting movement of the end cable storage frame means between an in-line configuration which is in-line with the central switch frame means and a folded configuration in which the end cable storage frame means is positioned in front of the central switch frame means.

Specifically, the end cable storage means includes a first cable storage frame and a second cable storage frame, each for holding cables. Further, there are first and second junction panels.

The hinge means includes first hinge assembly means for hingedly connecting one end of the first junction panel to the first end cable storage frame and an opposite end of the first junction panel to one end of the central switch frame means in a manner to permit pivoting movement of the first end cable storage frame between an in-line configuration which is in-line with the central switch frame means and a folded configuration in which the first end cable storage frame is positioned in front of the central switch frame means, and second hinge assembly means for hingedly connecting one end of the second junction panel to the second end cable storage frame and an opposite end of the second junction panel to an opposite end of the central switch frame means in a manner to permit pivoting movement of the second end cable storage frame between an in-line configuration which is in-line with the central switch frame means and a folded configuration in which the second end cable storage frame is positioned in front of the central switch frame means.

Preferably, the first and second hinge assembly means each include a first piano hinge which hingedly connects a respective end cable storage frame to a respective junction panel, and a second piano hinge which hingedly connects a respective end of the central switch frame means to a respective junction panel.

In one embodiment, the central switch frame means includes first and second switch bays and a main controller bay sandwiched between the first and second switch bays, with the main controller bay being rigidly fixed with the first and second switch bays in an in-line configuration.

Thus, the first junction panel is hingedly connected between the first switch bay and the first cable storage frame by the first hinge assembly means, and the second junction panel is hingedly connected between the second switch bay and the second cable storage frame by the second hinge assembly means.

A first channel member means is connected between the central switch frame means and the end cable storage frame means, for maintaining the transport apparatus in the in-line configuration, and a second channel member means is connected between the central switch frame means and the end cable storage frame means, for maintaining the transport apparatus in the folded configuration.

In accordance with another aspect of the present invention, a transport apparatus for large network telecommunication equipment, includes central switch frame means for holding electronic equipment; end cable storage frame means for holding cables; at least one junction panel; hinge means for hingedly connecting one end of each junction panel to the end cable storage means and an opposite end of each junction panel to the central switch frame means in a manner to permit pivoting movement of the end cable storage frame means between an in-line configuration which is in-line with the central switch frame means and a folded configuration in which the end cable storage frame means is positioned in front of the central switch frame means; and the end cable storage frame means and the central switch means each include tie bar means for supporting a cable bundle extending between the end cable storage frame means and the central switch means in a looped U-shape extending across the junction panels.

The above and other objects, features and advantages of the invention will become readily apparent from the following detailed description thereof which is to be read in connection with the accompanying drawings.

BRIEF DESCRIPTION OF THE DRAWING

FIG. 5 is a front elevational view of the apparatus of FIG. 1, in a folded configuration;

FIG. 6 is an end elevational view of the apparatus of FIG. 5; and

FIG. 7 is a top plan view of the apparatus of FIG. 5.

DESCRIPTION OF THE PREFERRED EMBODIMENTS

Figure 1:
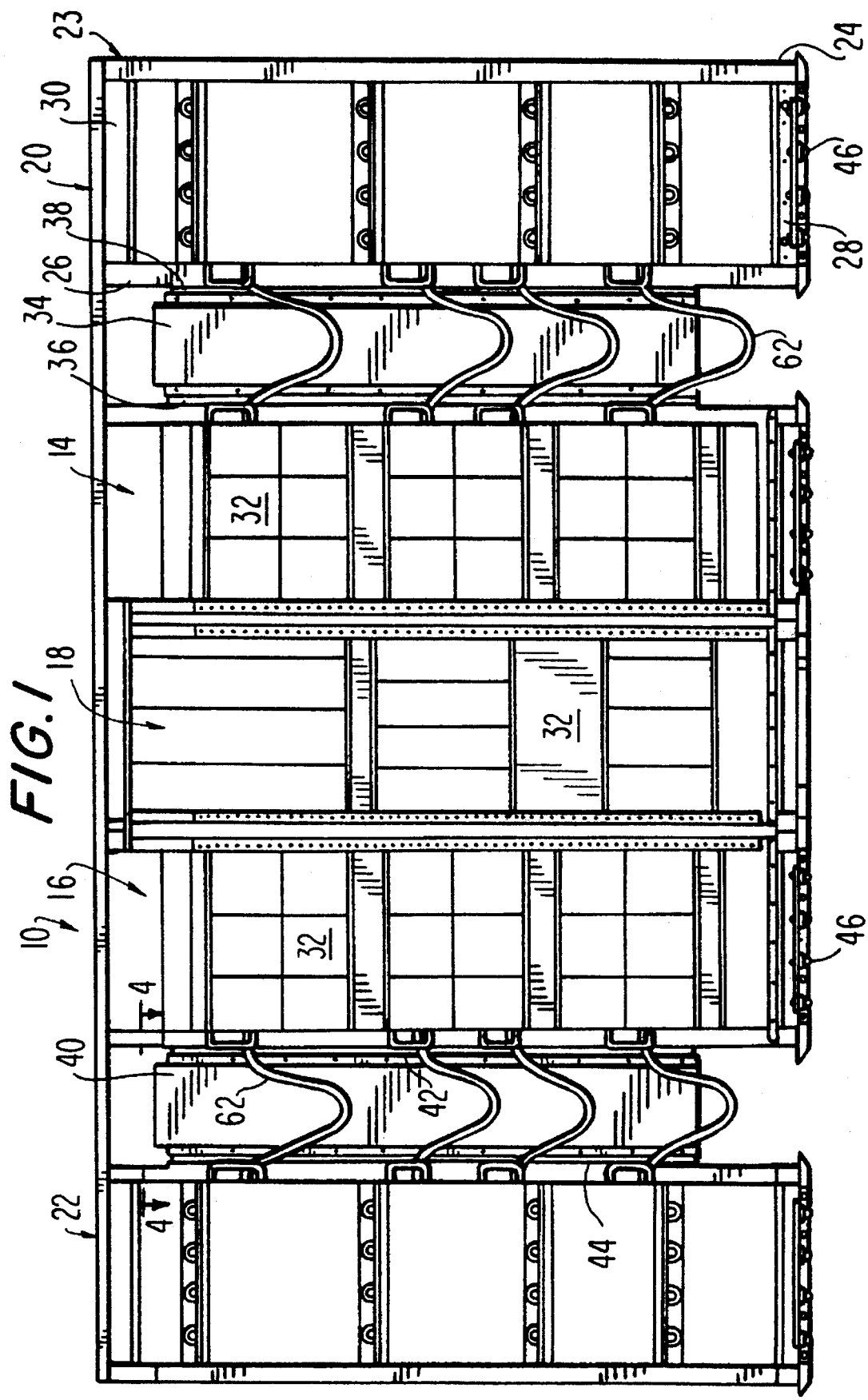
FIG. 1 is a rear elevational view of transport apparatus for large network telecommunication equipment according to the present invention, in an in-line arrangement.
Figure 2:
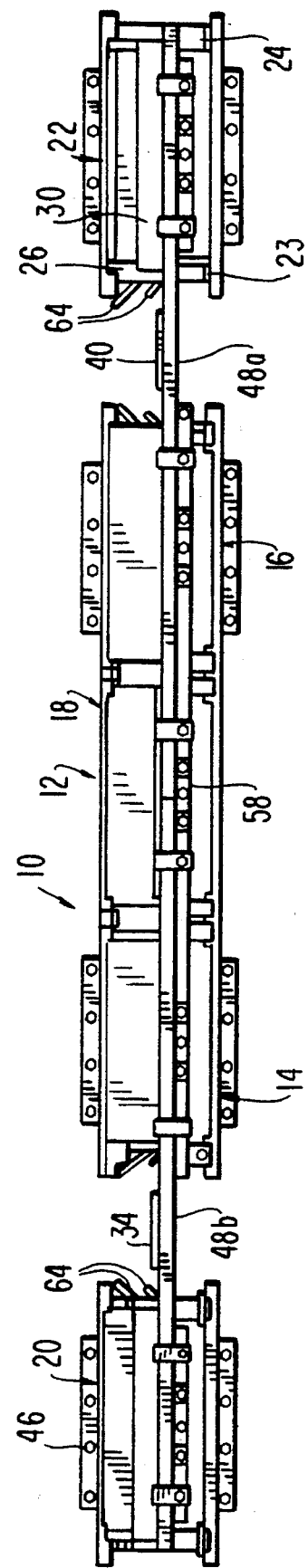
FIG. 2 is a top plan view of the apparatus of FIG. 1.
Figure 3:
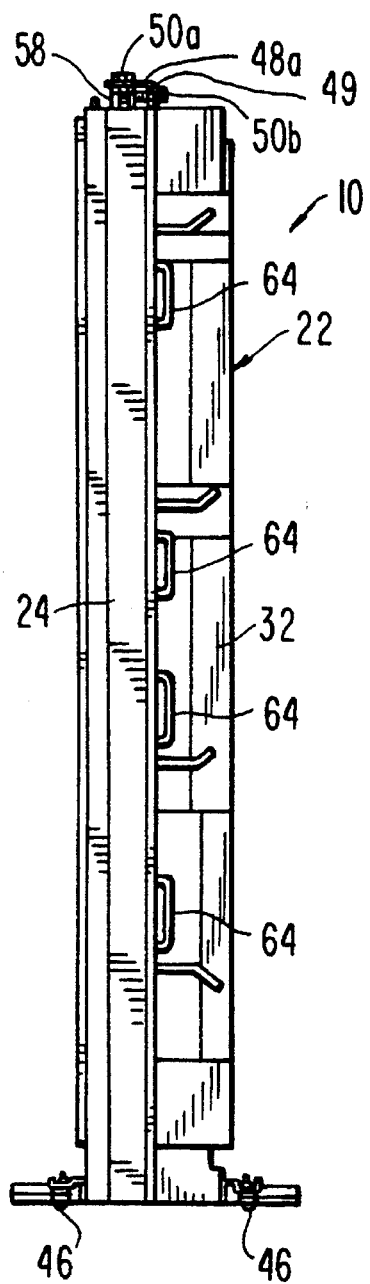
FIG. 3 is an end elevational view of the apparatus of FIG. 1.
Figure 4:
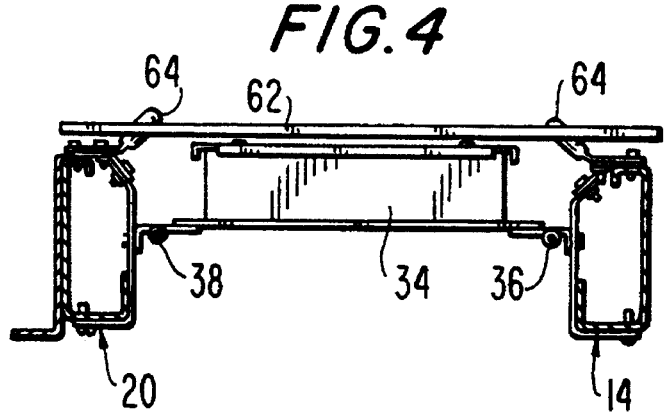
FIG. 4 is a partial cross-sectional view of the apparatus of FIG. 1, taken along line 4—4 thereof.

Referring to the drawings in detail, there is shown a transport apparatus 10 for large network telecommunication equipment, and particularly, for a DACS IV-2000 (512) system. Transport apparatus 10 includes a switch complex 12 comprised of two switch bays 14 and 16, and a main controller bay 18 sandwiched between switch bays 14 and 16. Controller bay 18 and switch bays 14 and 16 are rigidly secured together at the factory in the in-line arrangement of FIGS. 1–4. Further, the cables (not shown) between controller bay 18 and switch bays 14 and 16 are also preinstalled in the factory.

Transport apparatus 10 further includes two cable storage bays 20 and 22 on opposite sides of switch bays 14 and 16 and secured to free ends of switch bays 14 and 16, in a manner which will be described in more detail hereinafter.

Each bay 14–22 is formed of a metal network bay frame or rack 23. Each frame 23 is formed by two vertically oriented end panels 24 and 26 in parallel, spaced apart relation, a connecting base 28 which connects together the lower ends of end panels 24 and 26, and a top support 30 which connects together the upper ends of end panels 24 and 26. Thus, there is front and rear access to telecommunication cross-connect equipment 32 and cables mounted on frames 23.

In accordance with one aspect of the present invention, cable storage bays 20 and 22 are hingedly connected with opposite sides of switch bays 14 and 16. Specifically, a vertically oriented junction panel 34 is hingedly connected at one side by conventional piano hinges 36 to the outer end of switch bay 14 and is hingedly connected at the opposite side by conventional piano hinges 38 to the inner end of cable storage bay 20. In like manner, a vertically oriented junction panel 40 is hingedly connected at one side by conventional piano hinges 42 to the outer end of switch bay 16 and is hingedly connected at the opposite side by conventional piano hinges 44 to the inner end of cable storage bay 22. It will be appreciated that, although the present invention is preferably used with piano hinges, other types of hinges can be used.

With this arrangement, transport apparatus 10 can be moved between the in-line configuration of FIGS. 1–4 and the folded three by two configuration of FIGS. 5–7 in which cable storage bays 20 and 22 are folded to the front of switch bays 14 and 16. In the folded configuration, transport apparatus 10 is better suited for moving in elevators, around corners and the like. After transport apparatus 10 is moved to the desired site, it can be configured in the in-line configuration. Further, casters 46 can be provided for supporting and moving transport apparatus 10.

In order to retain transport apparatus 10 in the in-line configuration of FIGS. 1–4, two long top channel members 48a and 48b are connected by brackets 49 and bolts 50a,50b to a top channel member 58 which is bolted across the top ends of the bays 14–18. To retain transport apparatus 10 in the folded configuration of FIGS. 5–7, two short channel members 52 and 54 are connected by brackets 56 across to the top ends of bays 14 and 20, and bays 16 and 22, respectively. In addition, a long top channel member 58 is connected across bays 14–18, and a long top channel member 60 is connected across bays 20 and 22. The retention of transport apparatus 10 in the in-line configuration or the folded configuration by means of the channel members is helpful when transporting apparatus 10, although it is not essential. Thus, during transportation, it may be better to leave switch complex 12 flexible with respect to cable storage bays 20 and 22, by means of the piano hinges, so as to more easily negotiate apparatus 10 through aisles and the like.

In accordance with another aspect of the present invention, cable bundles 62 are connected to bays 14 and 16 and stored in bays 20 and 22, respectively, are draped across cable tie bars 64 at opposing ends of cable storage bay 20 and switch bay 14, and at opposing ends of cable storage bay 22 and switch bay 16, and hang down in a substantially U-shape across junction panels 34 and 40, respectively. As a result of this arrangement, any rotation of cable storage bays 20 and 22 relative to switch bays 14 and 16, only results in rotation of cable bundles 62 about a vertical axis passing substantially through cable tie bars 64 and generally in-line with the piano hinges. In other words, there is a strain relief point very close to each piano hinge. This dramatically reduces the stress on cable bundles 62 which would otherwise occur if the cable bundles 62 were oriented straight across in a horizontal plane. In the latter case, there would be a larger stress along the entire cable bundle 62 as it is bent in the horizontal plane. Cable tie bars 64 are only shown in some of the drawings for simplicity of the drawings.

Accordingly, the use of the hinged assembly enables transport of apparatus 10 in a more compact arrangement, while also enabling pre-assembly of all cables in the factory, with greater stress relief for the cables being provided.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention as defined by the appended claims.

What I claim is:

1. A transport apparatus for large network telecommunication equipment comprising:

central switch frame means for holding electronic equipment;

end cable storage frame means for holding cables;

at least one junction panel;

hinge means for hingedly connecting one end of each said junction panel to said end cable storage frame means and an opposite end of each said junction panel to said central switch frame means in a manner to permit pivoting movement of said end cable storage frame means between an in-line configuration which is in-line with said central switch frame means and a folded configuration in which said end cable storage frame means is positioned in front of said central switch frame means;

said end cable storage frame means and said central switch means supporting a cable bundle draped between said end cable storage frame means and said central switch means in a looped U-shape extending across said at least one junction panel, thereby enabling pivoting of said end cable storage frame means between said in-line configuration and said folded configuration.

2. A transport apparatus for large network telecommunication equipment comprising:

central switch frame means for holding electronic equipment, said central switch frame means including first and second switch bays and a main controller bay sandwiched between said first and second switch bays with said main controller bay being rigidly fixed with said first and second switch bays in an in-line configuration;

end cable storage frame means including a first cable storage frame and a second cable storage frame each for holding cables;

first and second junction panels;

first hinge assembly means for hingedly connecting one end of said first junction panel to said first cable storage frame and an opposite end of said first junction panel to one end of said central switch frame means in a manner to permit pivoting movement of said first cable storage frame between an in-line configuration which is in-line with said central switch frame means and a folded configuration in which said first cable storage frame is positioned in front of said central switch frame means; and second hinge assembly means for hingedly connecting one end of said second junction panel to said second cable storage frame and an opposite end of said second junction panel to an opposite end of said central switch frame means in a manner to permit pivoting movement of said second cable storage frame between an in-line configuration which is in-line with said central switch frame means and a folded configuration in which said second cable storage frame is positioned in front of said central switch frame means.

3. A transport apparatus according to claim 2, wherein said first and second hinge assembly means each include a first piano hinge which hingedly connects a respective said end cable storage frame to a respective said junction panel, and a second piano hinge which hingedly connects a respective end of said central switch frame means to a respective said junction panel.

4. A transport apparatus according to claim 2, wherein said first junction panel is hingedly connected between said first switch bay and said first cable storage frame by said first hinge assembly means, and said second junction panel is hingedly connected between said second switch bay and said second cable storage frame by said second hinge assembly means.

5. A transport apparatus according to claim 2, further including first channel member means, connected between said central switch frame means and said end cable storage frame means, for maintaining said transport apparatus in said in-line configuration, and second channel member means connected between said central switch frame means and said end cable storage frame means, for maintaining said transport apparatus in said folded configuration.

6. A transport apparatus for large network telecommunication equipment comprising:

central switch frame means for holding electronic equipment, said central switch frame means including first and second switch bays and a main controller bay sandwiched between said first and second switch bays with said main controller bay being rigidly fixed with said first and second switch bays in an in-line configuration;

end cable storage frame means including a first cable storage frame and a second cable storage frame, each for holding cables;

first and second junction panels;

first hinge assembly means for hingedly connecting one end of said first junction panel to said first cable storage frame and an opposite end of said first junction panel to one end of said central switch frame means in a manner to permit pivoting movement of said first cable storage frame between an in-line configuration which is in-line with said central switch frame means and a folded configuration in which said first cable storage frame is positioned in front of said central switch frame means; and second hinge assembly means for hingedly connecting one end of said second junction panel to said second cable storage frame and an opposite end of said second junction panel to an opposite end of said central switch frame means in a manner to permit pivoting movement of said second cable storage frame between an in-line configuration which is in-line with said central switch frame means and a folded configuration in which said second cable storage frame is positioned in front of said central switch frame means; and said end cable storage frame means and said central switch means each including tie bar means for supporting a cable bundle extending between said end cable storage frame means and said central switch means in a looped U-shape extending across said first and second junction panels.

7. A transport apparatus according to claim 6, wherein said first and second hinge assembly means each include a first piano hinge which hingedly connects a respective said end cable storage frame to a respective said junction panel, and a second piano hinge which hingedly connects a respective end of said central switch frame means to a respective said junction panel.

8. A transport apparatus according to claim 6, wherein said first junction panel is hingedly connected between said first switch bay and said first cable storage frame by said first hinge assembly means, and said second junction panel is hingedly connected between said second switch bay and said second cable storage frame by said second hinge assembly means.

9. A transport apparatus according to claim 6, further including first channel member means, connected between said central switch frame means and said end cable storage frame means, for maintaining said transport apparatus in said in-line configuration, and second channel member means connected between said central switch frame means and said end cable storage frame means for maintaining said transport apparatus in said folded configuration.

* * * * *